United States Patent
Klann (10) Patent No.: US 8,607,363 B2
(45) Date of Patent: Dec. 17, 2013

(54) USER OBJECT SECURING ASSEMBLY

(76) Inventor: Jeremiah D. Klann, Peace Dale, RI (US)

( * ) Notice: Subject to any disclaimer, the term of this patent is extended or adjusted under 35 U.S.C. 154(b) by 101 days.

(21) Appl. No.: 13/047,941

(22) Filed: Mar. 15, 2011

(65) Prior Publication Data

US 2011/0162121 A1    Jul. 7, 2011

Related U.S. Application Data (63) Continuation-in-part of application No. 12/637,026, filed on Dec. 14, 2009, now abandoned.

(51) Int. Cl.
*A41D 1/00* (2006.01)
*A41D 27/20* (2006.01)

(52) U.S. Cl.
USPC .............................. 2/69; 2/115; 2/249; 2/250

(58) Field of Classification Search
USPC ........... 2/115, 69, 108, 102, 94, 247–254, 50, 2/51, 88, 118, 119, 120; 224/236, 930, 224/182, 191, 196, 197, 677; 361/679.03, 361/679.56
See application file for complete search history.

(56) References Cited

U.S. PATENT DOCUMENTS

| | | | | |
|---|---|---|---|---|
| 986,273 | A * | 3/1911 | Eloesser | 2/247 |
| 2,853,709 | A * | 9/1958 | Peterson et al. | 2/51 |
| 4,539,700 | A * | 9/1985 | Sato | 381/333 |
| 4,667,347 | A | 5/1987 | Greer | |
| 5,072,456 | A | 12/1991 | Elin | |
| 5,416,310 | A | 5/1995 | Little | |
| 5,526,535 | A | 6/1996 | Dobrzenski | |
| 5,555,490 | A | 9/1996 | Carroll | |
| 5,884,338 | A * | 3/1999 | Golde | 2/247 |
| 5,988,577 | A | 11/1999 | Phillips et al. | |
| 6,354,477 | B1 | 3/2002 | Trummer | |
| 6,962,277 | B2 | 11/2005 | Quintana et al. | |
| 7,065,792 | B2 * | 6/2006 | Hautala | 2/69 |
| D608,983 | S * | 2/2010 | Myers | D2/857 |

(Continued)

FOREIGN PATENT DOCUMENTS

| | | |
|---|---|---|
| EP | 1316262 | 11/2002 |
| EP | 1760896 | 8/2005 |
| EP | 1731987 | 6/2006 |

OTHER PUBLICATIONS

English language (machine) translation of EP 1731987 from EPO's http://worldwide.espacenet.com 8 pages.

*Primary Examiner* — Amy Vanatta
(74) *Attorney, Agent, or Firm* — Cesari and McKenna, LLP (57) ABSTRACT

A user object securing assembly for securing a user manipulative object such as user interface at a user-accessible area of a user-wearable garment. The assembly includes a flap having a first edge for joining to the user-accessible area of the garment to form a generally horizontal hinge line, and a second, opposite, edge which may be free. A user object securing device is connected to the flap between those edges, the flap being swingable about the hinge line between a closed position wherein the flap lies against the garment and an open position wherein the flap extends away from the garment with the securing device facing upward. A fastening device releasably fastens the flap in its closed position. The user manipulative object may include a user interface such as a cell phone or the like, as well as other such objects including a billfold, wallet, credit card holder, coin carrier and the like.

25 Claims, 6 Drawing Sheets

(56) References Cited

U.S. PATENT DOCUMENTS

| | | |
|---|---|---|
| 2002/0017545 A1 | 2/2002 | Badillo et al. |
| 2002/0189000 A1 | 12/2002 | Jordan |
| 2003/0182714 A1* | 10/2003 | Mariland et al. ............... 2/247 |
| 2003/0219115 A1* | 11/2003 | Kohli et al. ............ 379/428.01 |
| 2004/0187183 A1 | 9/2004 | Hautala |
| 2006/0176660 A1* | 8/2006 | Amiri .......................... 361/683 |
| 2009/0139013 A1 | 6/2009 | Sapowycz et al. |
| 2010/0175161 A1* | 7/2010 | Jarboe ............................. 2/69 |
| 2010/0325767 A1 | 12/2010 | Crimi et al. |
| 2011/0009164 A1* | 1/2011 | Amiri ....................... 455/556.2 |
| 2011/0185469 A1 | 8/2011 | Santuccio et al. |

\* cited by examiner

USER OBJECT SECURING ASSEMBLY

CROSS-REFERENCE TO RELATED APPLICATIONS

This application is a continuation-in-part of Ser. No. 12/637,026, filed Dec. 14, 2009, now abandoned and hereby incorporated herein by reference.

BACKGROUND OF THE INVENTION

This invention relates generally to a securing assembly for a user manipulative object or device of the type that is normally carried by the user and that, when used, must be viewed by the user and then manipulated to accomplish a specific purpose or goal. One such user manipulative object is a user interface such as a cell phone, personal digital assistant, handheld computer game and the like which has a working surface containing a pad, and/or display which must be viewed by a user while the user actuates the keys on the pad. Other such user manipulative objects include items such as billfolds, wallets, credit card holders, coin carriers and the like, which, when used, must be viewed by the user and manipulated, for example, to remove the desired bill or credit card. The invention relates especially to a securing assembly for securing such a user manipulative object to a garment worn by the user.

User manipulative objects of the type of interest here are usually carried by the user in a general purpose pocket of a garment being worn by the user. When the object is to be used, it must be removed from the pocket and held toward the front area of the user so that the user can view the object, for example, a user interface's display and/or pad, and manipulate the object as is appropriate, for example, activate the user interface's keys or control buttons using the digits of one or both hands. If while the object is being used, the user should accidentally lose his/her grip on the object, it or its contents can fall to the ground and may become damaged. This could be a likely event particularly when the user is trying to manipulate the object with cold fingers in a northern climate. When the object is no longer being used, it must be returned to the user's pocket or stowed away in some other less convenient location. Thus, the object takes up limited pocket space which could be used for other purposes.

Also, it is well known that moisture can cause problems for handheld electronic devices, one type of user manipulative object of interest here. That is, a user interface, when in use, may be adversely affected by rain. Less obviously, it may also be damaged by the user's perspiration, even when the interface is stowed in the user's pocket, particularly when the user is active on a hot summer day, exercising, or the like.

It would thus be desirable if there existed a securing assembly specifically designed to support, secure and protect a user manipulative object at a location more or less in the front area of a user where the object is accessible, can be viewed and manipulated by the user and would normally be positioned when in use.

SUMMARY OF THE INVENTION

Accordingly, it is an object of this invention to provide a user object securing assembly which may secure a user manipulative object to a location more or less in the front area of a garment worn by the user where the object can be viewed and manipulated by the user and is normally positioned when in use.

Another object of the invention is to provide an assembly of this type which protectively encloses the object when the object is not in use.

A further object of the invention is to provide a user object securing assembly which may be incorporated into, or added to, a garment often worn by a user of such an object.

Still another object of the invention is to provide such an assembly that protects the object, preventing it or its contents from falling out of the assembly and shields the object from outside influences such as moisture and the like.

Other objects will, in part, be obvious and will, in part, appear hereinafter.

The invention accordingly comprises the features of construction, combination of elements and arrangement of parts which will be exemplified in the constructions hereinafter set forth, and the scope of the invention will be indicated in the claims.

Briefly, my user object securing assembly is designed to be incorporated into, or added to, more or less at or near the front area of a garment which may be worn by the user of the object. The assembly comprises a flap having a first edge adapted to be joined to the front area of the garment to form a generally horizontal hinge line, and a second, generally opposite edge which may be free. A user object securing device is connected to the flap between those edges, and the flap is grippable by the user and swingable between a closed position wherein the flap lies flush against the garment and an open position wherein the flap extends away from the garment with the securing device facing generally upward.

Thus, my assembly provides a very convenient protective enclosure for the object when it is not in use that is located very near the spot where the device will be positioned when in use. Furthermore, the object is releasably attached to the assembly so that if the user should accidentally lose his/her grip on the object when using same, it or its contents will not fall to the ground.

As will be described in more detail later, the securing device may shield the object from undesirable influences, such as, in the case of a user manipulative device such as an electronic user interface, outside moisture that could damage the electronic circuitry therein, even when the interface is not in use.

Further, as we shall see, the assembly is relatively easy and inexpensive to make so that its incorporation into a garment should not materially increase the overall cost of the garment.

Specific illustrative embodiments of the assembly of the invention are described in detail below for the case where the user manipulative object is a user interface. As noted above, however, those skilled in the art will appreciate that the securing assembly of the invention can also readily be adapted for use in securing other user manipulative objects to a garment of a user, such as billfolds, wallets, credit card holders, coin carriers and the like. Like user interfaces, these other objects are typically carried by a user in a general purpose pocket of the user's garment, and must be removed from the pocket to an area of the garment where the object can be viewed and appropriately manipulated by the user. Once use of the object is completed, the object is generally returned to the pocket. The securing assembly as described below can be used to facilite the use and storage of not only user interfaces, but also these other user manipulative objects as well.

BRIEF DESCRIPTION OF THE DRAWINGS

For a fuller understanding of the nature and objects of the invention, reference should be made to the following detailed description taken in connection with the accompanying drawings, in which.

DESCRIPTION OF PREFERRED EMBODIMENTS

Figure 1A:
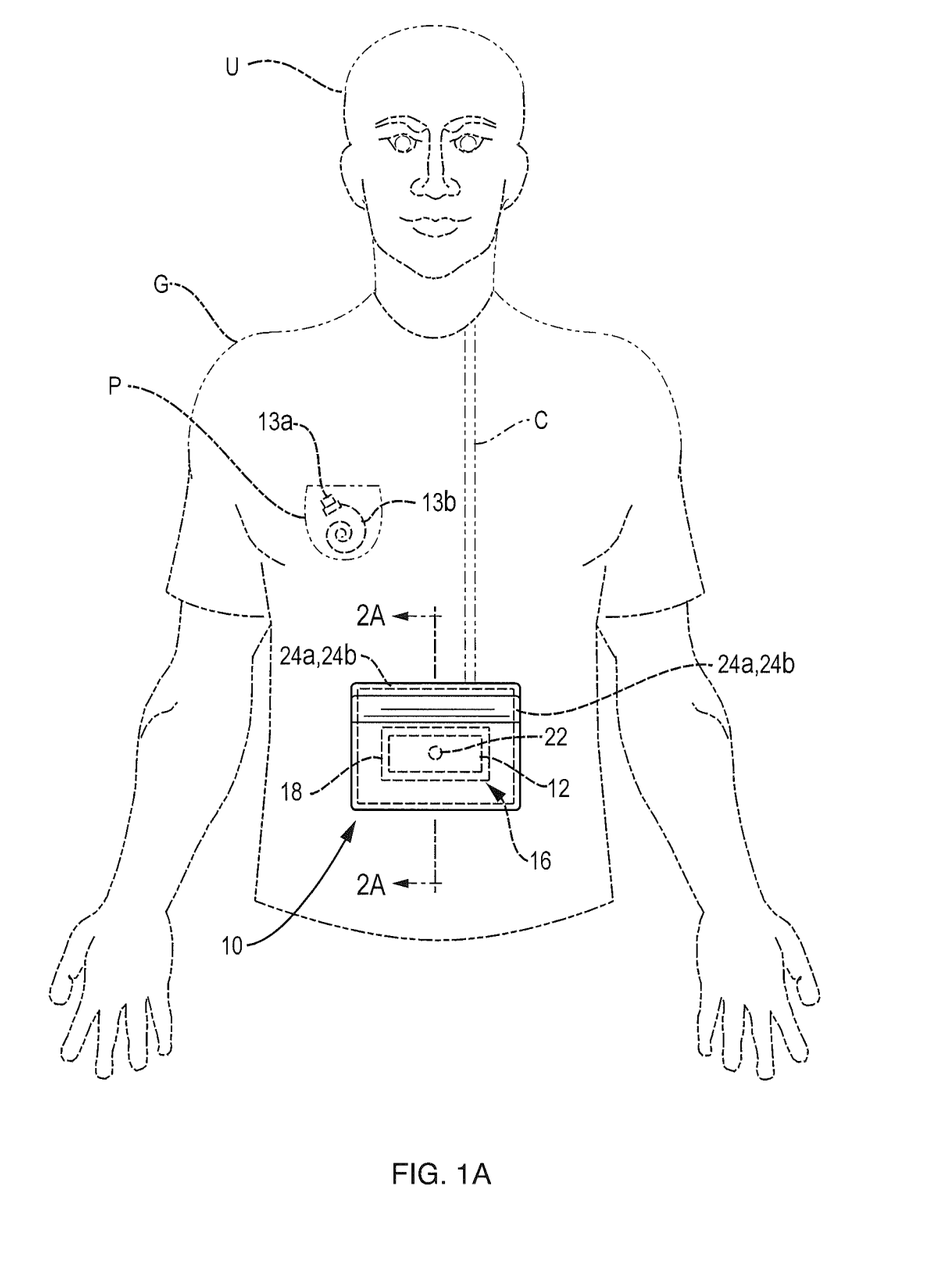
FIG. 1A is a front elevational view of a garment incorporating a user interface support assembly according to the invention, showing the assembly in its closed position.
Figure 1B:
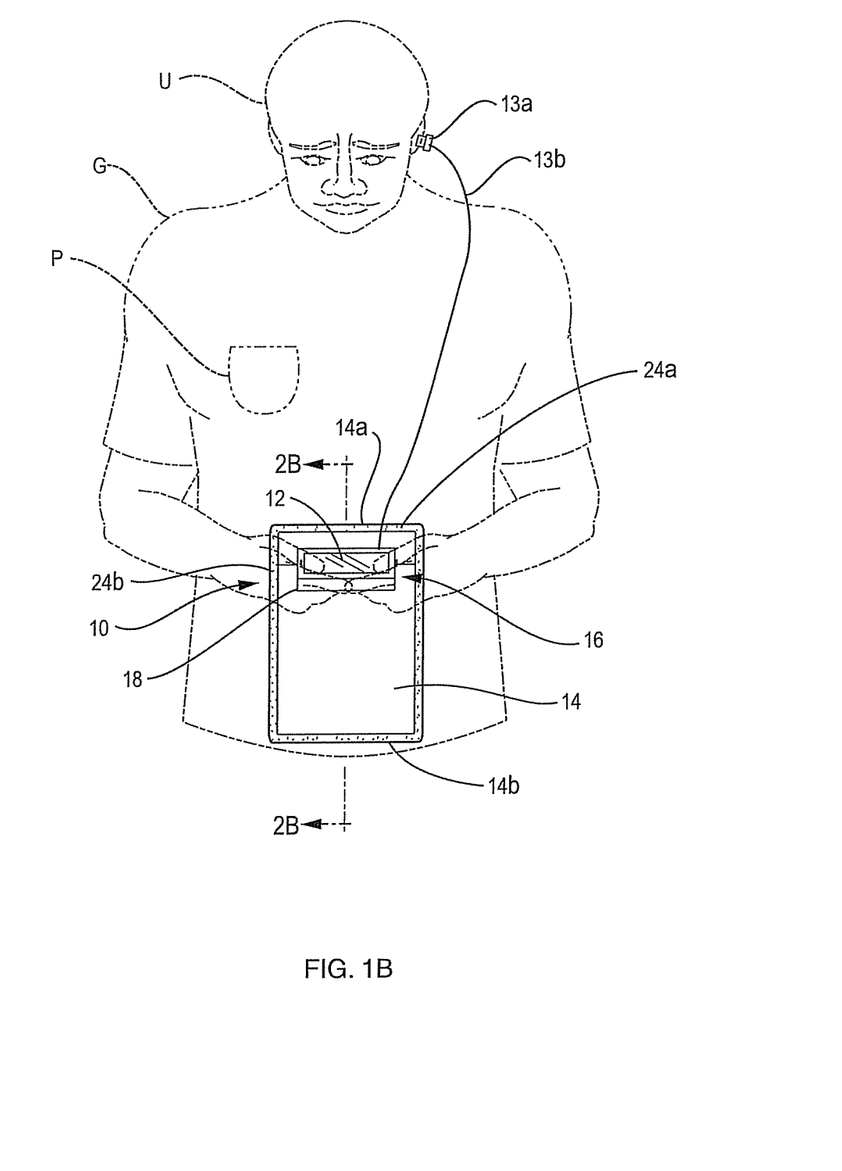
FIG. 1B is a similar view of the garment, showing the assembly in its open position.

Referring to FIGS. 1A and 1B of the drawings, a user U is shown wearing a garment G incorporating a user interface support assembly shown generally at 10 according to this invention. The term "garment" is used herein in a broad sense to encompass any item that is worn, attached to or carried on the person of a user, including any item of clothing, apparel or wear, such as a shirt, parka, jacket, vest or other top, and other accessory-type items such as harnesses, belts, wraps and the like.

FIG. 1A shows assembly 10 in a closed position supporting a user interface 12 wherein the interface is stowed flat against garment G and completely enclosed within assembly 10. FIG. 1B illustrates assembly 10 in an open position, allowing the user to grip the interface 12 with one hand so that the interface extends out away from the garment with its working surface 12a facing upward. Thus, by looking down, the user can see the display and/or pad at that surface and depress the appropriate keys or buttons with the fingers of the other hand. Alternatively, the user may grip the interface with the fingers of both hands and depress the keys or buttons with his/her thumbs in the usual way.

As used herein, the term "user interface" is meant to include a cell phone, personal digital assistant, electronic game, computing device, tablet, calculator, pocket radio or television, audio player, camera and other comparable handheld electronic devices.

As shown in those figures, garment G may include a breast pocket P for holding is one or two ear buds 13a with a variable length lead 13b that may be connected to interface 12 when the interface is in its open position and each ear bud is placed in a user's ear as shown in FIG. 1B. Alternatively, the ear bud(s) may be stowed in a garment collar pocket or in assembly 10 along with interface 12 and possibly a battery charger for the interface. If desired, a channel C (FIG. 1A) may extend along the garment front panel between the collar and the assembly 10 to accommodate lead 13b.

Figure 2A:
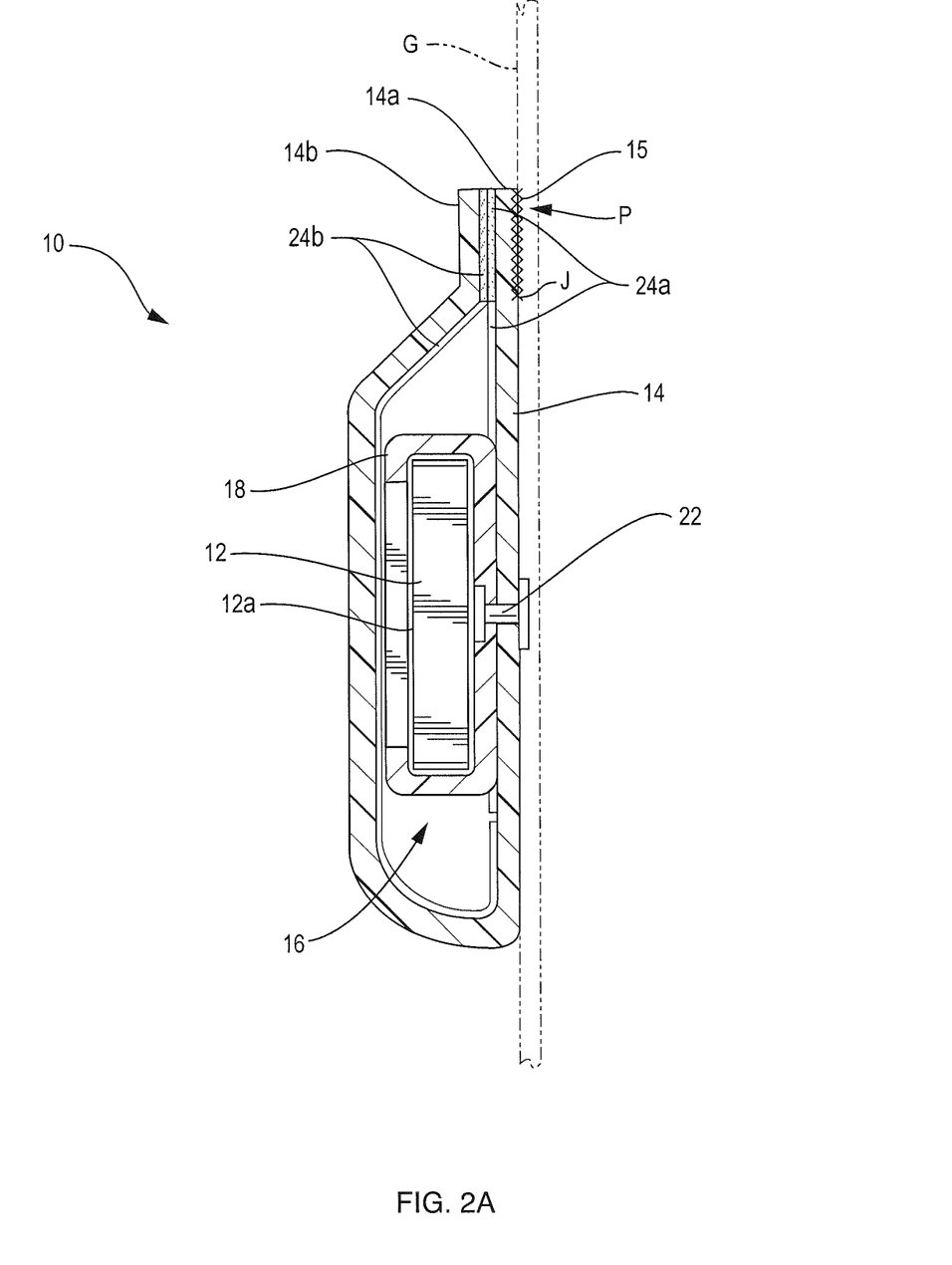
FIG. 2A is a sectional view on a larger scale taken along line 2A-2A of FIG. 1A.
Figure 2B:
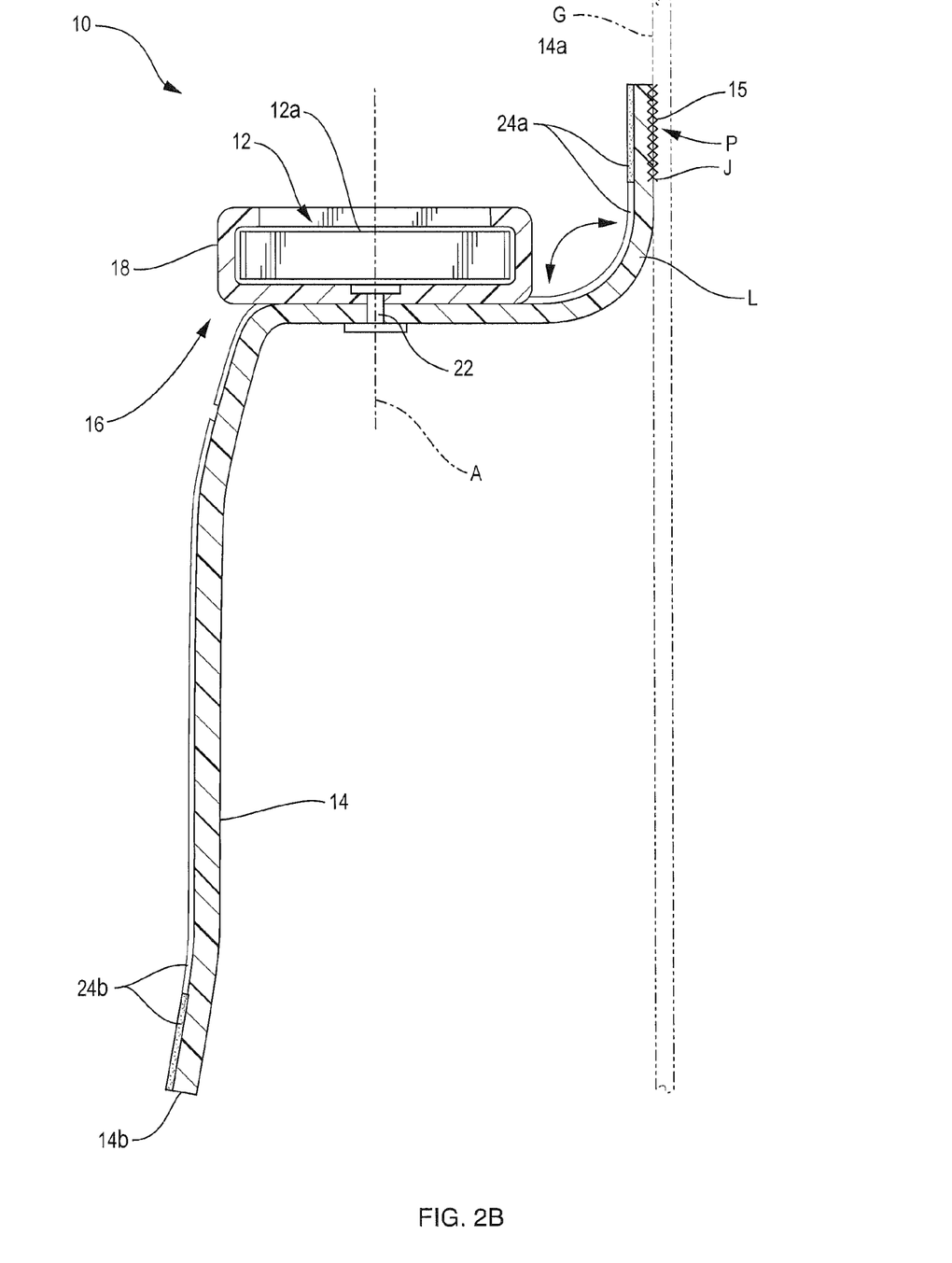
FIG. 2B is a similar view taken along line 2B-2B of FIG. 1B.

Refer now to FIGS. 2A and 2B which show the components of assembly 10 in greater detail. As seen there, assembly 10 includes a flap 14 having a joining portion indicated generally at P, constituted by an upper edge or margin 14a joined generally to the front area of garment G where it is accessible by the user, by stitching 15 or other suitable joining means such as adhesive, releasable fasteners or the like. The lower edge of stitching 15 constitutes a joint J so as to form a generally horizontal hinge line L about which flap 14 may fold or swing. Flap 14 also has a second edge or margin 14b which is more or less parallel to edge or margin 14a and which hangs free when assembly is in its open position shown in FIGS. 1B and 2B.

Flap 14 may be of the same flexible material as garment G or of any other suitable fabric or plastic sheet material.

The user interface 12 is releasably secured to flap 14 between its ends or margins 14a and 14b by a securing device shown generally at 16. In the assembly embodiment 10, device 16 may include a case 18 having a transparent face and which protectively encloses interface 12 such that the working surface 12a of the interface is still visible and accessible as shown. Case 18 may, in turn, be connected to flap 14 by a connection such as a pivot 22 which extends through the back of case 18 and through the flap, thus allowing the case 18 and its contents to pivot about the axis A when assembly 10 is in its open position shown in FIG. 2B. This allows the interface 12 to be oriented relative to the user so that either a side or an end thereof is closest to the user depending upon the user's preference for a given user interface. In the event that such rotation is neither needed nor desired, case 18 may be secured to flap 14 by other fixed or releasable securing means such as staples, adhesive, hook and loop fasteners, snap fasteners, stitching, etc. Also, case 18 may be a conventional case, one which is specially designed and dimensioned to mate with the flap component of the assembly or simply a pocket or recess or elastic strap attached to the flap in which the user interface is captured.

In any event, when assembly 10 is in its open position, the case 18 and interface surface 12a face generally upward and are visible to the user. Thus, the user can clearly see the display at surface 12a and manipulate any control keys or buttons on that surface. It is important to note that if the user should lose his/her grip on the interface when using same, the attached flap will prevent the interface from falling to the ground and possibly being damaged by the impact. Also, the case 18 protects the interface from outside influences such as moisture due to the weather, user perspiration, beverage spills and the like.

In assembly 10 described thus far, the flap 14 is quite long so that it hangs down an appreciable distance below case 18 when assembly 10 is in its open position shown in FIG. 2B. Thus, when the user interface 12 is no longer in use, the user may release the interface so that the flap and interface may hang down vertically from hinge line L. Then, the lower segment of the flap may be folded up and over the front of the interface as shown in FIG. 2A until the flap 14 is doubled back on itself with the edges 14a and 14b of the flap being more or less in register. Those opposing edges, as well as the opposing side edges of the flap, may be releasably fastened together by mating fastener elements such as the illustrated hook and loop fastener strips 24a and 24b, or comparable releasable fasteners such as snap fasteners, flexible complementary magnetic strips sewn into the fabric of the garment G and in the marginal edges of the flap 14.

When assembly 10 is in its closed position shown in FIGS. 1A and 2A, the user interface 12 lies flush against the front of the user, providing an aesthetic, unobtrusive appearance against the garment G. In its closed position, the user interface 12 is also protectively enclosed within the folded flap 14 so that it is shielded from impacts as well as from other potentially damaging outside influences.

Obviously, the specific dimensions of the flap may vary depending upon the shape and size of the interface 12 or other object to be secured thereby.

Figure 3A:
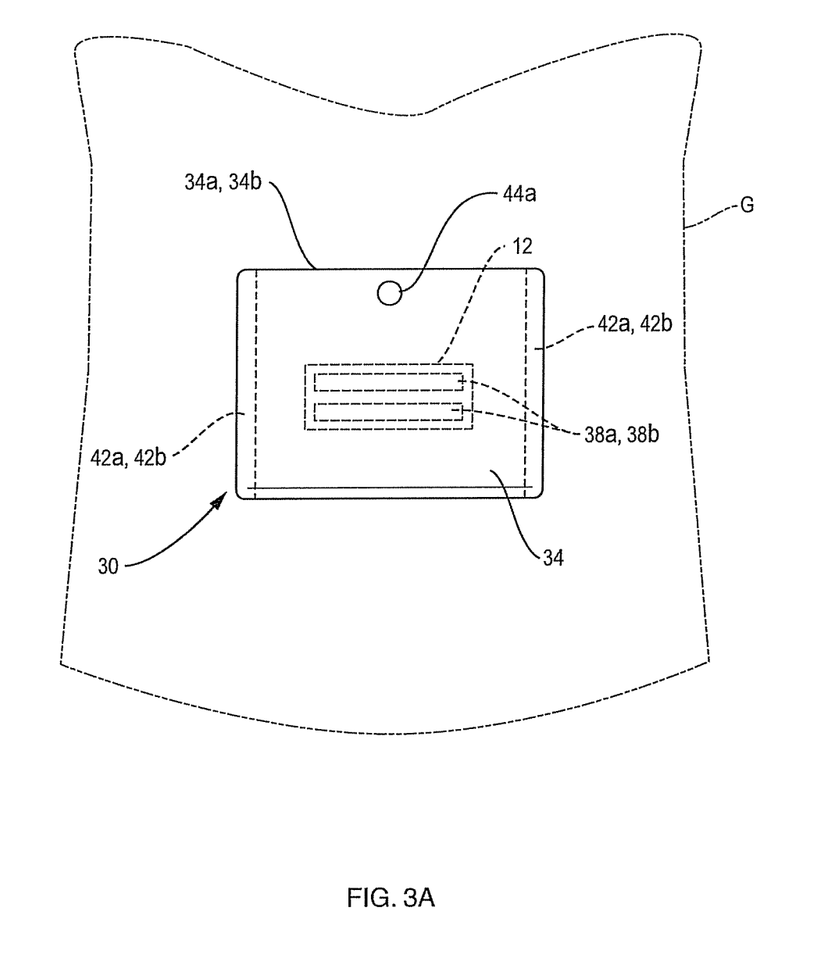
FIG. 3A is a fragmentary elevational view of a second embodiment of the assembly, showing the assembly in its closed position.
Figure 3B:
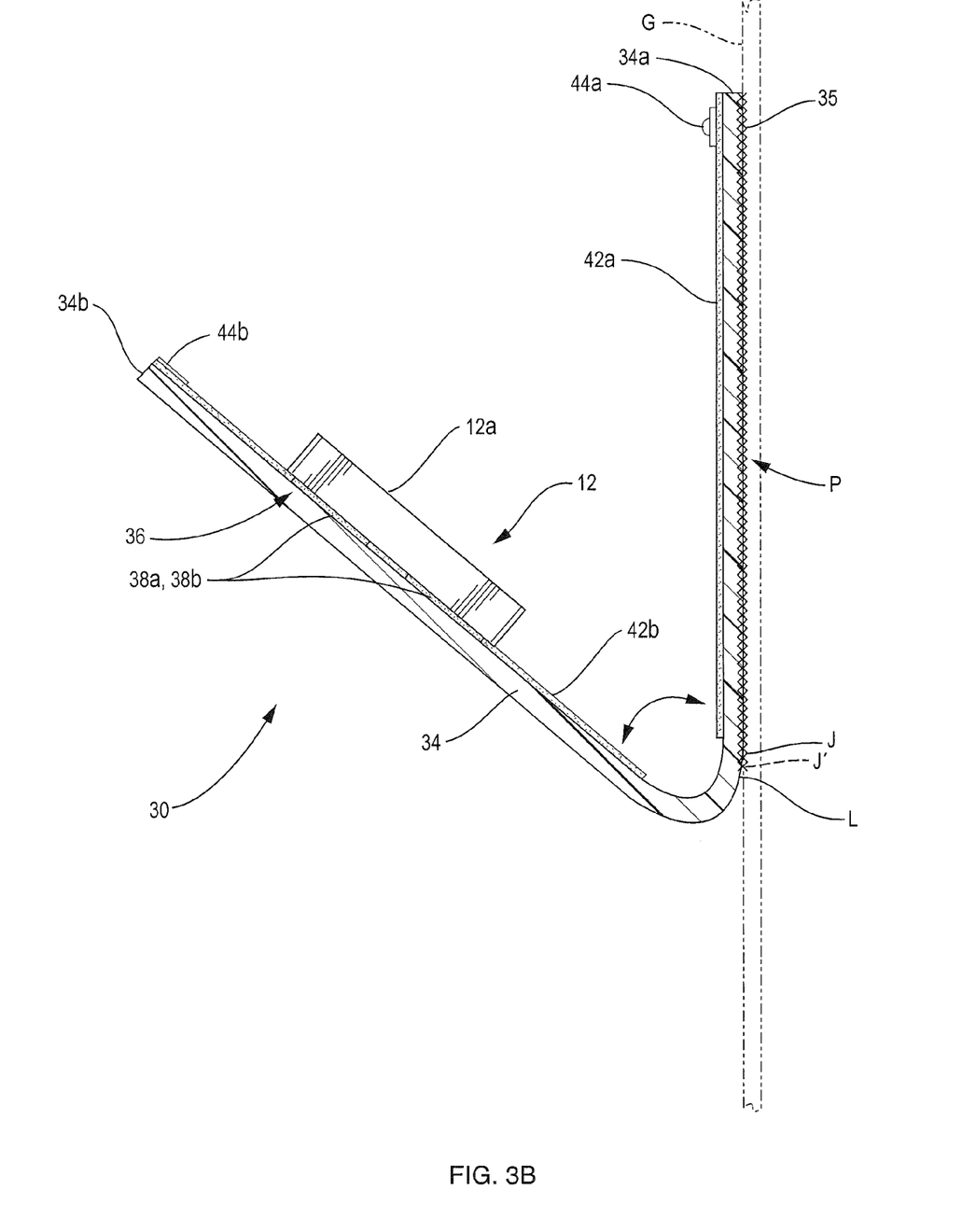
FIG. 3B is a sectional view similar to FIG. 2B, showing that second embodiment in a partially open position.

Refer now to FIGS. 3A and 3B which illustrate a second embodiment of the object securing assembly indicated generally at 30. In FIG. 3A, the assembly 30 is shown in its closed position wherein the user interface 12 is protectively enclosed by the assembly, whereas FIG. 3B shows the assembly 30 in a partially open position.

Assembly 30 comprises a flap 34 joined at a joining portion P generally to the front area of garment G, where it is accessible by the user, by stitches 35 or by other known permanent or releasable fastening means. The lower edge of stitches 35 forms a joint J so that the flap can swing about a generally horizontal hinge line L just below joint J at the bottom of the flap. In this case, the fold line is located more or less midway along the length of the flap and at least part of a flap area between a flap upper edge or margin 34a and that line, constituting portion P, is joined to garment G. The user interface 12 is secured to flap 34 between hinge line L and a free edge or margin 34b of the flap by a securing device shown generally at 36.

In this embodiment, the securing device 36 comprises one or more mating hook and loop fastener strip(s) 38a and 38b. Strip(s) 38a may be adhered or otherwise secured to the back of user interface 12, while strip(s) 38b is adhered or otherwise secured to flap 34 between edges or margins 34a, 34b thereof. As with the FIGS. 1A and 1B embodiment of the invention, flap 34 may be swung about the hinge line L between an open position wherein the securing device 36 and the working surface 12a of interface 12 face upward, and a closed position wherein the interface 12 and flap 34 lie generally parallel to the garment G.

The flap may be releasably secured in its closed position by mating hook and loop fastener strips 42a and 42b extending along the opposite side edges of flap 34 above (42a) and below (42b) the hinge line L. Thus, when assembly 30 is in its closed position shown in FIG. 3A, the user interface 12 is protectively enclosed within a pocket formed by the folded flap 34. If desired, the mouth of that pocket may be closed by mating snap fastener elements 44a and 44b, which elements may also be used at the sides of the flap in lieu of the hook and loop fastener strips 42a, 42b, and in the FIG. 1 assembly embodiment. Alternatively, as noted above, the flap may be releasbly secured in its closed position using complementary flexible magnetic strips sewn into the fabric of the garment G along the outline of the flap and in the marginal edges of the flap.

In this embodiment, the interface is not enclosed within a protective case 18. Therefore, to ensure that the interface will not be damaged by outside influences, such as moisture from rain or perspiration when stowed away, the flap 34 may be made of a moisture impermeable material such as a sheet of plastic or a sheet of fabric/film laminate.

It will thus be seen the objects set forth above, among those made apparent from the preceding description, are efficiently attained. Also, certain changes may be made in the above description without departing from the scope of the invention. For example, the assemblies 10 and 30 may be made part of the garment G as sold or joined to the garment by the consumer. In the former case, a portion of flap 34 just above the hinge line L in FIG. 3B may be joined to the garment as shown in phantom at J, the rest of the flap above that joint being omitted and the fasteners 42a, 44a being anchored directly to the garment G. Therefore, it is intended that all matter contained in the above description or shown in the accompanying drawings be interpreted as illustrative and not in a limiting sense.

It is also to be understood that the following claims are intended to cover all of the generic and specific features of the invention described herein.

The invention claimed is:

1. A user object securing assembly for securing a user manipulative electronic object at an area of a user-wearable garment which is accessible to the user, said assembly comprising:

a flexible flap comprising a single piece of material having a first margin, a second, generally opposite, margin and a joining portion for joining to the user-accessible area of the garment to form a generally horizontal hinge line;
a user object securing device for releasably securing a user manipulative electronic object, the securing device being connected to the flap between said margins, said flap being grippable by the user and swingable about the hinge line between a closed position wherein the flap lies against the garment and an open position wherein the flap extends away from the garment with the securing device facing generally upward, and
a fastening device for releasably fastening the flap in said closed position
wherein said joining portion is located between said first and second margins of the flap and the flap also includes side edges, further including fasteners releasably fastening the opposing edges of the flap when the flap is in said closed position to form a pocket that contains the securing device;
further including a user manipulative electronic object releasably secured to the flap by the securing device; and
wherein the securing device includes a pivot which allows the user interface to pivot generally parallel to the flap when the flap is in said open position.

2. The assembly defined in claim 1 wherein the securing device includes
a case for containing a user manipulative electronic object, and
a connection connecting the case to said flap.

3. The assembly defined in claim 2 wherein the connection is a pivotal connection which allows the case to pivot generally parallel to the flap.

4. The assembly defined in claim 1 and further including a user manipulative electronic object constituted by a user interface releasably secured by the securing device, said user interface having a working surface facing away from the flap so that when the flap is in said open position, the working surface faces generally upward.

5. The assembly defined in claim 4 wherein the user interface is selected from the group consisting of cell phone, personal digital assistant, electronic game, computer, tablet, pocket radio, pocket television, audio player, video player and camera.

6. The assembly defined in claim 1 wherein the fastening device comprises first and second mating fasteners, said first fastener being connected to the first margin of said flap, said second fastener being connected to the second margin of said flap, said first and second fasteners, when mated, becoming releasably fastened together.

7. The assembly defined in claim 6 wherein the first and second fasteners comprise mating snaps.

8. The assembly defined in claim 6 wherein the first and second fasteners comprise mating hook-and-loop fasteners.

9. The assembly defined in claim 6 wherein the first and second fasteners comprise complementary flexible magnetic strips.

10. The assembly defined in claim 1 and further including a panel of the garment at a user-accessible area of the garment and a generally horizontal joint between said flap and said panel.

11. The assembly defined in claim 10 wherein said joint defines the hinge line.

12. The assembly defined in claim 10 wherein said joining portion comprises said first margin of the flap and the joint joins the joining portion to said panel.

13. The assembly defined in claim 10 wherein said joining portion is located between said first and second margins and the joint joins the joining portion to said panel.

14. The assembly defined in claim 1 wherein the fastening device includes mating fastener elements for securing together all opposing free edges of the flap when the flap is in said closed position.

15. The assembly defined in claim 1 wherein said flap is of a moisture impermeable material.

16. A garment incorporating a user electronic object securing assembly, said securing assembly including
a flexible flap comprising a single piece of material having a first margin, a second, generally opposite margin and a joining portion joined to the garment to form a generally horizontal hinge line;
a user electronic object securing device connected to the flap between said margins, said flap being grippable by a wearer of the garment and swingable about the hinge line between a closed position wherein the flap lies against the garment and an open position wherein the flap extends away from the garment with the securing device facing upward, and
a fastening device for releasably fastening the flap in said closed position;
wherein said joining portion is located between said first and second margins of the flap and the flap also includes side edges, further including fasteners releasably fastening the opposing edges of the flap when the flap is in said closed position to form a pocket that contains the securing device;

further including a user manipulative electronic object releasably secured to the flap by the securing device; and
wherein the securing device includes a pivot which allows the user interface to pivot generally parallel to the flap when the flap is in said open position.

17. The garment defined in claim 16 wherein said joining portion comprises the first margin of the flap.

18. The garment defined in claim 16 wherein said joining portion is located between said margins of the flap.

19. The garment defined in claim 16 and further including a user manipulative electronic object removably attached to the flap by the securing device.

20. The garment defined in claim 19 wherein the user manipulative electronic object is a user interface selected from the group consisting of cell phone, personal digital assistant, electronic game, computer, tablet, pocket radio, pocket television, audio player, video player and camera.

21. The garment defined in claim 16 and further including a receptacle in the garment for holding ear buds with an extendable and retractable plug-in lead and/or a battery charger for the interface device.

22. The garment defined in claim 21 and further including ear buds in the receptacle and a channel in the garment connecting the receptacle and securing assembly.

23. The garment defined in claim 16 wherein the fastening device comprises mating snaps.

24. The garment defined in claim 16 wherein the fastening device comprises mating hook-and-loop fasteners.

25. The garment defined in claim 16 wherein the fastening device comprises complementary flexible magnetic strips.

* * * * *

UNITED STATES PATENT AND TRADEMARK OFFICE
CERTIFICATE OF CORRECTION

| | | |
|---|---|---|
| PATENT NO. | : 8,607,363 B2 | Page 1 of 1 |
| APPLICATION NO. | : 13/047941 | |
| DATED | : December 17, 2013 | |
| INVENTOR(S) | : Jeremiah D. Klann | |

It is certified that error appears in the above-identified patent and that said Letters Patent is hereby corrected as shown below:

In the specification:

Column 3, line 46 should read:
pocket P for holding one or two ear buds 13a with a variable Column 3, line 63 should read:
generally horizontal hinge line L just below the joint about which flap 14 may Signed and Sealed this
Twenty-ninth Day of September, 2015

Michelle K. Lee
*Director of the United States Patent and Trademark Office*